United States Patent
Zhang et al.

(10) Patent No.: US 9,537,610 B2
(45) Date of Patent: Jan. 3, 2017

(54) TIME DIVISION DUPLEX ADAPTIVE FRAME STRUCTURE RETRANSMISSION METHOD, NETWORK AND TERMINAL SIDE DEVICE

(71) Applicant: ZTE Corporation, Shenzhen (CN)

(72) Inventors: Xiaobo Zhang, Shenzhen (CN); Bin Yu, Shenzhen (CN); Wenfeng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 86 days.

(21) Appl. No.: 14/385,215

(22) PCT Filed: Mar. 4, 2013

(86) PCT No.: PCT/CN2013/072135
§ 371 (c)(1),
(2) Date: Sep. 15, 2014

(87) PCT Pub. No.: WO2013/135144
PCT Pub. Date: Sep. 19, 2013

(65) Prior Publication Data
US 2015/0036557 A1    Feb. 5, 2015

(30) Foreign Application Priority Data

Mar. 16, 2012 (CN) .......................... 2012 1 0071511
Nov. 28, 2012 (CN) .......................... 2012 1 0491440

(51) Int. Cl.
*H04L 1/08* (2006.01)
*H04L 1/18* (2006.01)
(Continued)

(52) U.S. Cl.
CPC .............. *H04L 1/08* (2013.01); *H04B 7/2656* (2013.01); *H04L 1/1861* (2013.01);
(Continued)

(58) Field of Classification Search
None
See application file for complete search history.

(56) References Cited

U.S. PATENT DOCUMENTS

2011/0310830 A1    12/2011 Wu et al.

FOREIGN PATENT DOCUMENTS

| CN | 101414900 A | 4/2009 |
| CN | 102075309 A | 5/2011 |

(Continued)

OTHER PUBLICATIONS

Google #1, "Translation of CN102075309A", Chinese Patent Office, Apr. 22, 2009.*

(Continued)

*Primary Examiner* — Kwang B Yao
*Assistant Examiner* — Adam Duda
(74) *Attorney, Agent, or Firm* — McClure, Qualey & Rodack, LLP

(57) ABSTRACT

A technology of dynamically allocating uplink and downlink subframes in an LTE-advanced Time Division Duplex (TDD) communication system specifically relates to a TDD adaptive frame structure retransmission method, network and terminal side device. The method includes: in a TDD adaptive frame transmission process, for an uplink subframe, if a frame structure whose Round Trip Time (RTT) period of a Physical Hybrid-ARQ Indicator Channel (PHICH) and a Physical Uplink Shared Channel (PUSCH) corresponding to the uplink subframe is 10 ms is found in seven already defined frame structures, transmitting PHICH data on a corresponding downlink subframe in the found frame structure, and receiving retransmitted data on the corresponding uplink subframe in the found frame structure. The technical solution of the present application ensures the (Continued)

Hybrid Automatic Repeat Request (HARQ) compatibility with an uplink data channel of an R10UE.

7 Claims, 1 Drawing Sheet

(51) Int. Cl.
*H04B 7/26* (2006.01)
*H04L 5/14* (2006.01)
*H04W 72/04* (2009.01)
*H04L 5/00* (2006.01)
*H04W 76/04* (2009.01)
*H04W 88/02* (2009.01)

(52) U.S. Cl.
CPC ............ *H04L 1/1893* (2013.01); *H04L 5/003* (2013.01); *H04L 5/14* (2013.01); *H04W 72/042* (2013.01); *H04W 76/046* (2013.01); *H04W 88/02* (2013.01)

(56) References Cited

FOREIGN PATENT DOCUMENTS

| | | |
|---|---|---|
| CN | 102355731 A | 2/2012 |
| EP | 2424288 A1 | 2/2012 |
| WO | WO 2010/092474 A1 | 8/2010 |
| WO | WO 2011/038801 A2 | 4/2011 |

OTHER PUBLICATIONS

Google #2, "Translation of CN101414900A", Chinese Patent Office, Apr. 22, 2009.*
English-language abstract of Chinese Patent No. CN 101414900 A, European Patent Office, Apr. 22, 2009.
English-language abstract of Chinese Patent No. CN 102075309 A, European Patent Office, Apr. 22, 2009.
English-language abstract of Chinese Patent No. CN 102355731 A, European Patent Office, Apr. 22, 2009.
"3$^{rd}$ Generation Partnership Project; Technical Specification Group Radio Access Network; Evolved Universal Terrestrial Radio Access (E-UTRA); Physical Channels and Modulation (Release 10)," 3GPP Standard; 3GPP TS 36.211, 3$^{rd}$ Generation Partnership Project (3GPP), Mobile Competence Centre, 650 Route des Lucioles, F-06921 Sophia Antipolis Cedex, France, vol. RAN WG1, No. V10.4.0, pp. 1-101, Dec. 12, 2011.
"3$^{rd}$ Generation Partnership Project; Technical Specification Group Radio Access Network; Evolved Universal Terrestrial Radio Access (E-UTRA); Physical Channels and Modulation (Release 10)," 3GPP Standard; 3GPP TS 36.213, 3$^{rd}$ Generation Partnership Project (3GPP), Mobile Competence Centre, 650 Route des Lucioles, F-06921 Sophia Antipolis Cedex, France, vol. RAN WG1, No. V10.4.0, pp. 1-125, Dec. 15, 2011.
Alcatel-Lucent Shanghai Bell, et al., "Performance evaluation of LTE TDD DL-UL reconfiguration in accordance with traffic adaptation," 3GPP Draft, R1-120512, 3$^{rd}$ Generation Partnership Project (3GPP), Mobile Competence Centre, 650 Route des Lucioles, F-06921 Sophia Antipolis Cedex, France, vol. RAN WG1, Dresden, Germany, pp. 1-6, Feb. 2, 2012.

* cited by examiner

TIME DIVISION DUPLEX ADAPTIVE FRAME STRUCTURE RETRANSMISSION METHOD, NETWORK AND TERMINAL SIDE DEVICE

TECHNICAL FIELD

The present document relates to a technology of dynamically allocating uplink and downlink subframes in an LTE-advance (3GPP Release 11) TDD communication system, and in particular, to a timing configuration solution of a Time Division Duplexing (TDD) adaptive frame structure.

BACKGROUND OF THE RELATED ART

In the LTE and LTE-A standards, a TDD system frame is composed of ten subframes. The 3GPP supports totally seven types of frame structures, as shown in Table one.

TABLE ONE

TDD system uplink and downlink frame structure

| Uplink and downlink structure sequence number | Handover point period from downlink to uplink | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Currently in the 3GPP standard, the UE is notified of a frame structure configured by a current serving cell through system information SIB-I. According to the existing standard, a minimum change period of the SIB information is 640 ms. In a pre-research project of "dynamic TDD frame structure" formally approved by the 3GPP in the RAN54 (December 2011) plenary session, it is possible to more dynamically allocate the TDD system frame structure. The change period of the TDD system frame structure is shortened to make full use of the TDD characteristics so as to better support asymmetric traffic transmission.

However, there is no specific solution about how to set the retransmission of a downlink data frame. Further, in the uplink synchronous HARQ process, a further solution about how to retransmit PUSCH to avoid conflict with the R10UE is also needed.

SUMMARY OF THE INVENTION

The technical problem to be solved by the present document is how to configure an A/N feedback of a Physical Downlink Shared Channel (PDSCH) according to an uplink A/N resolution and how to maintain the Hybrid Automatic Repeat Request (HARQ) compatibility with an uplink data channel of an R10UE. Therefore, the present document provides a TDD adaptive frame structure retransmission method, network and terminal side device.

In order to solve the above technical problem, the present document discloses a Time Division Duplex (TDD) adaptive frame structure retransmission method, comprising:

in a TDD adaptive frame transmission process, for an uplink subframe, if a frame structure whose Round Trip Time (RTT) period of a Physical Hybrid-ARQ indicator channel (PHICH) and a Physical Uplink Shared Channel (PUSCH) corresponding to the uplink subframe is 10 ms is found in seven already defined frame structures, transmitting PHICH data on a corresponding downlink subframe in the found frame structure, and receiving retransmitted data on the corresponding uplink subframe in the found frame structure.

Preferably, the above method further comprises: if a frame structure whose RTT period of a PHICH and a PUSCH corresponding to the uplink subframe is 10 ms is not found in seven already defined frame structures, newly defining a frame structure whose RTT period is 10 ms or an integral multiple of 10 ms, transmitting the PHICH data on a corresponding downlink subframe in the newly defined frame structure, and receiving retransmitted data on the corresponding uplink subframe in the newly defined frame structure, wherein the newly defined frame structure is one that does not conflict with various subframes in the seven already defined frame structures.

Preferably, the above method further comprises: if a frame structure whose RTT period of a PHICH and a PUSCH corresponding to the uplink subframe is 10 ms is not found in seven already defined frame structures, only transmitting new uplink data on the uplink subframe; or configuring the uplink subframe as a downlink subframe.

Preferably, the above method further comprises:

in a TDD adaptive frame transmission process, for a downlink subframe, searching for an uplink subframe closest to the downlink subframe in seven already defined frame structure time sequencing relationships, and if a number of Physical Downlink Shared Channels (PDSCHs) associated with the found uplink subframe is less than or equal to 4, feeding back an Acknowledgement/Negative Acknowledgement (A/N) on the uplink subframe; and if a number of PDSCHs associated with the found uplink subframe is larger than 4, feeding back an A/N on an uplink subframe after the found uplink subframe that is closest to the found uplink subframe in seven already defined frame structure time sequencing relationships and of which a number of associated PDSCHs is less than or equal to 4.

Preferably, in the above method, if the uplink subframe after the found uplink subframe that is closest to the found uplink subframe in seven already defined frame structure time sequencing relationships and of which a number of associated PDSCHs is less than or equal to 4 does not exist, feeding back an A/N on the found uplink subframe.

Preferably, the above method further comprises: in the above TDD adaptive frame structure transmission process, a network side semi-statically notifying a User Equipment (UE) through a Radio Resource Control (RRC) signaling to enter an adaptive frame structure handover state, and after receiving the RRC, the UE performing a data operation according to a predefined time sequencing relationship; or the network side notifying the UE of a dynamically configured time sequencing relationship of various subframes through set dynamic signaling, and the UE performing a data operation according to the time sequencing relationship of various subframes in the received set dynamic signaling.

The present document further provides a TDD adaptive frame structure retransmission method, comprising:

in a TDD adaptive frame transmission process, for a downlink subframe, searching for an uplink subframe closest to the downlink subframe in seven already defined frame structure time sequencing relationships, and if a number of Physical Downlink Shared Channels (PDSCHs) associated with the found uplink subframe is less than or equal to 4, feeding back an Acknowledgement/Negative Acknowledgement (A/N) on the uplink subframe; and if a number of PDSCHs associated with the found uplink subframe is larger than 4, feeding back an A/N on an uplink subframe after the found uplink subframe that is closest to the found uplink subframe in seven already defined frame structure time sequencing relationships and of which a number of associated PDSCHs is less than or equal to 4.

Preferably, in the above method, if the uplink subframe after the found uplink subframe that is closest to the found uplink subframe in seven already defined frame structure time sequencing relationships and of which a number of associated PDSCHs is less than or equal to 4 does not exist, feeding back an A/N on the found uplink subframe.

Preferably, the above method further comprises: in the above TDD adaptive frame structure transmission process, a network side semi-statically notifying a User Equipment (UE) through a Radio Resource Control (RRC) signaling to enter an adaptive frame structure handover state, and after receiving the RRC, the UE performing a data operation according to a predefined time sequencing relationship; or the network side notifying the UE of a dynamically configured time sequencing relationship of various subframes through set dynamic signaling, and the UE performing a data operation according to the time sequencing relationship of various subframes in the received set dynamic signaling.

The present document further discloses a network side device, comprising:

a first module configured to search for a frame structure whose Round Trip Time (RTT) period of a Physical Hybrid-ARQ Indicator Channel (PHICH) and a Physical Uplink Shared Channel (PUSCH) corresponding to an uplink subframe is 10 ms is found in seven already defined frame structures for the uplink subframe in a Time Division Duplex (TDD) adaptive frame transmission process; and a second module configured to transmit PHICH data on a corresponding downlink subframe in the frame structure found by the first module, and receive retransmitted data on the corresponding uplink subframe in the found frame structure.

Preferably, in the above device, the first module is further configured to newly define a frame structure whose RTT period is 10 ms or an integral multiple of 10 ms when a frame structure whose RTT period of a PHICH and a PUSCH corresponding to the uplink subframe is 10 ms is not found, wherein the newly defined frame structure is one that does not conflict with various subframes in the seven already defined frame structures;

the second module is configured to transmit the PHICH data on a corresponding downlink subframe in the frame structure newly defined by the first module, and receive retransmitted data on the corresponding uplink subframe in the newly defined frame structure.

Preferably, in the above device, the first module is configured to further configure the uplink subframe as a downlink subframe when a frame structure whose RTT period of a PHICH and a PUSCH corresponding to the uplink subframe is 10 ms is not found; or configure the uplink subframe to only transmit new uplink data thereon.

Preferably, the above device further comprises: a third module configured to semi-statically notify a User Equipment (UE) through a Radio Resource Control (RRC) signaling to enter an adaptive frame structure handover state, so that the UE performs a data operation according to a predefined time sequencing relationship; or notify the UE of a dynamically configured time sequencing relationship of various subframes through set dynamic signaling.

Preferably, the above device further comprises: a fourth module configured to search for an uplink subframe closest to the downlink subframe in seven already defined frame structure time sequencing relationships for a downlink subframe;

a fifth module configured to receive an Acknowledgement/Negative Acknowledgement (A/N) on the uplink subframe when a number of Physical Downlink Shared Channels (PDSCHs) associated with the uplink subframe found by the fourth module is less than or equal to 4; and a sixth module configured to search for an uplink subframe after the uplink subframe found by the fourth module that is closest to the found uplink subframe in seven already defined frame structure time sequencing relationships and of which a number of associated PDSCHs is less than or equal to 4 and receive an A/N on the uplink subframe when a number of PDSCHs associated with the uplink subframe found by the fourth module is larger than 4.

Preferably, in the above device, the sixth module is configured to receive an A/N on the uplink subframe found by the fourth module when the uplink subframe after the uplink subframe found by the fourth module that is closest to the found uplink subframe in seven already defined frame structure time sequencing relationships and of which a number of associated PDSCHs is less than or equal to 4 does not exist.

The present document further discloses a terminal side device, comprising:

a first module configured to search for a frame structure whose Round Trip Time (RTT) period of a Physical Hybrid-ARQ Indicator Channel (PHICH) and a Physical Uplink Shared Channel (PUSCH) corresponding to an uplink subframe is 10 ms is found in seven already defined frame structures for the uplink subframe in a Time Division Duplex (TDD) adaptive frame transmission process; and a second module configured to receive PHICH data on a corresponding downlink subframe in the frame structure found by the first module, and transmit retransmitted data on the corresponding uplink subframe in the found frame structure.

Preferably, in the above device, the first module is configured to further newly define a frame structure whose RTT period is 10 ms or an integral multiple of 10 ms when a frame structure whose RTT period of a PHICH and a PUSCH corresponding to the uplink subframe is 10 ms is not found, wherein the newly defined frame structure is one that does not conflict with various subframes in the seven already defined frame structures;

the second module is configured to receive the PHICH data on a corresponding downlink subframe in the frame structure newly defined by the first module, and transmit retransmitted data on the corresponding uplink subframe in the newly defined frame structure, Preferably, in the above device, the first module is configured to receive downlink data on the subframe when a frame structure whose RTT period of a PHICH and a PUSCH corresponding to the uplink subframe is 10 ms is not found; or transmit new uplink data on the uplink subframe.

Preferably, the above device further comprises: a third module configured to enter an adaptive frame structure handover state by receiving a Radio Resource Control (RRC) signaling, to perform a data operation according to a predefined time sequencing relationship; or acquire a time sequencing relationship of various subframes by receiving set dynamic signaling.

Preferably, the above device further comprises: a fourth module configured to search for an uplink subframe closest to the downlink subframe in seven already defined frame structure time sequencing relationships for a downlink subframe;

a fifth module configured to transmit an Acknowledgement/Negative Acknowledgement (A/N) on the uplink subframe when a number of Physical Downlink Shared Channels (PDSCHs) associated with the uplink subframe found by the fourth module is less than or equal to 4;

a sixth module configured to search for an uplink subframe after the uplink subframe found by the fourth module that is closest to the found uplink subframe in seven already defined frame structure time sequencing relationships and of which a number of associated PDSCHs is less than or equal to 4 and transmit an A/N on the uplink subframe when a number of PDSCHs associated with the uplink subframe found by the fourth module is larger than 4.

Preferably, in the above device, the sixth module is configured to transmit an A/N on the uplink subframe found by the fourth module when the uplink subframe after the uplink subframe found by the fourth module that is closest to the found uplink subframe in seven already defined frame structure time sequencing relationships and of which a number of associated PDSCHs is less than or equal to 4 does not exist.

The technical solution of the present application ensures the HARQ compatibility with an uplink data channel of an R10UE. In addition, an A/N feedback of a PDSCH is further configured according to an uplink A/N resolution, thereby improving the retransmission performance.

PREFERRED EMBODIMENTS OF THE PRESENT INVENTION

Figure 1:
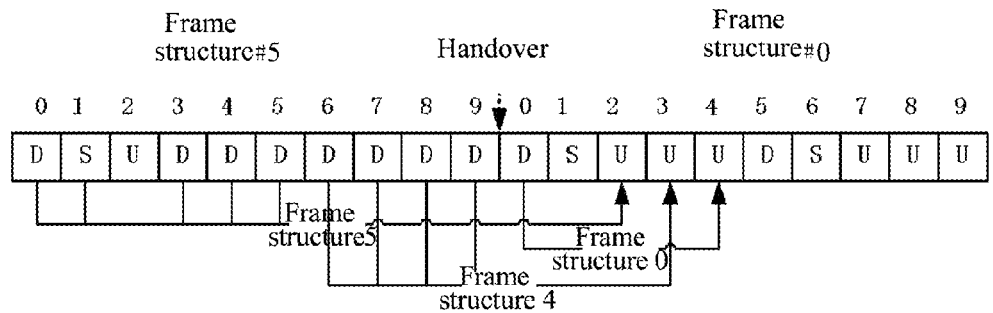
FIG. 1 is a diagram of handing over an uplink A/N time sequencing relationship from a frame structure 5 to a frame structure 0 according to the present embodiment.

The technical solutions of the present document will be further described in detail in conjunction with accompanying drawings hereinafter. It should be illustrated that, in the case of no conflict, the embodiments of this application and the features in the embodiments could be combined randomly with each other.

Embodiment One

The applicant proposes that in a frame structure configuration based on a minimum allocation unit of subframe, the uplink Acknowledgement/Negative Acknowledgement (A/N) resolution can be prioritized for frame structure allocation. The retransmission of the downlink data frame needs to be set according to the A/N resolution. The applicant also considers supporting two modes of A/N multiplexing and bundling in the existing standards. When a number of PDSCHs corresponding to a Physical Uplink Control Channel (PUCCH) is less than or equal to 4, both the multiplexing and bundling are supported. When the number of PDSCHs corresponding to a PUCCH is larger than 4, only the bundling is supported. Wherein, resources occupied by the multiplexing mode are more, but the multiplexing mode has a higher resolution, and can better improve the retransmission efficiency. On the basis of this, the applicant proposes a TDD adaptive frame structure retransmission method, which comprises:

in a TDD dynamic frame transmission process, for a downlink subframe of the current frame, searching for an uplink subframe closest to the downlink subframe in seven already defined frame structure time sequencing relationships, and if a number of PDSCHs associated with the found uplink subframe is less than or equal to 4, feeding back an A/N on the uplink subframe;

if a number of PDSCHs associated with the found uplink subframe is larger than 4, feeding back an A/N on an uplink subframe after the found uplink subframe that is closest to the found uplink subframe in seven already defined frame structure time sequencing relationships and of which a number of associated PDSCHs is less than or equal to 4.

In addition, if a number of PDSCHs associated with the found uplink subframe is larger than 4 and the uplink subframe after the found uplink subframe that is closest to the found uplink subframe in seven already defined frame structure time sequencing relationships and of which a number of associated PDSCHs is less than or equal to 4 does not exist, feeding back an A/N on the found uplink subframe.

It can be concluded from the above solution that in the TDD adaptive frame structure retransmission process of the present application, for the uplink A/N of the PDSCH, the HARQ time sequencing relationship needs to comply with the following rules:

A. Selecting an uplink subframe that is closest to the PDSCH subframe in seven already defined frame structure time sequencing relationships and of which a number of associated PDSCHs is less than or equal to 4.

B. When a number of PDSCHs associated with the uplink subframe closest to the PDSCH subframe in seven already defined frame structure time sequencing relationships is larger than 4, complying with the following two rules:

B1. Selecting an uplink subframe after the uplink subframe closest to the PDSCH subframe (i.e., an uplink subframe that is closest to the PDSCH subframe in seven already defined frame structure time sequencing relationships, which is an uplink subframe closest to the PDSCH subframe hereinafter for short), that is closest to the uplink subframe closest to the PDSCH subframe in seven already defined time sequencing relationships and of which a number of associated PDSCHs is less than or equal to 4.

B2. When there is no uplink subframe after the uplink subframe closest to the PDSCH subframe that is closest to the uplink subframe closest to the PDSCH subframe in seven already defined time sequencing relationships and of which a number of associated PDSCHs is less than or equal to 4, selecting the uplink subframe closest to the PDSCH subframe (i.e., an uplink subframe that is closest to the PDSCH subframe in seven already defined frame structure time sequencing relationships), and the number of PDSCHs associated with the selected uplink subframe is larger than 4 at this time. However, it should be illustrated that although the number of PDSCHs associated with the selected uplink subframe is larger than 4 at this time, and it needs to feed back the A/N using a bundling mode, but a number of A/Ns corresponding to the bundled PDSCH channels in the present embodiment is still less than that in the prior art, i.e., the present embodiment better solves the problem of feeding back the A/N, and improves the system performance.

In addition, in the above TDD dynamic frame transmission process, a network side semi-statically notifies a UE through Radio Resource Control (RRC) signaling to enter an adaptive frame structure handover state, and thus, after receiving the notification, the UE can perform a data operation according to a predefined time sequencing relationship; or the network side notifies the UE of a dynamically configured time sequencing relationship of various subframes through set dynamic signaling, and the UE performs the data operation according to a time sequencing relationship of various subframes in the dynamic signaling.

The retransmission process according to the present embodiment will be further described below in conjunction with accompanying drawings.

As shown in FIG. 1, when a frame structure #5 is handed over to a frame structure #0, a subframe 0/1/3/4 in the frame structure #5 complies with an HARQ time sequencing relationship of the frame structure #5. For a subframe 5, since there is no other suitable already defined HARQ timing, the subframe also needs to comply with the HARQ timing of the frame structure #5. A subframe 6/7/8/9 complies with an HARQ timing of the frame structure #4. Compared with a traditional HARQ timing, the subframe 6/7/8 can be associated with a next subframe 3, thereby avoiding a performance loss due to that only an A/N bundling can be used. A subframe 9 is also associated with the next subframe 3, thereby avoiding a delay due to being associated with an uplink subframe after 12 subframes. In addition, for a subframe 0/1/3/4/5 in the frame structure #5, although only an A/N bundling can be used, compared with the frame structure #5, a number of the bundled subframes is reduced by 3, thereby improving the performance.

Embodiment Two

Figure 2:
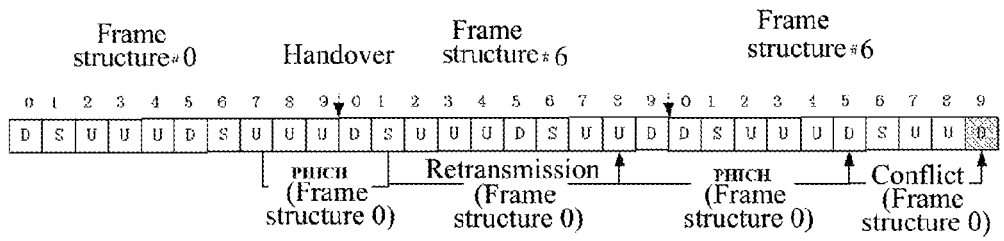
FIG. 2 is a diagram of a subframe conflict in an existing adaptive frame structure allocation.

The applicant also finds that the synchronous non-adaptive HARQ is used in the current standard, i.e., when an error occurs in the Physical Uplink Shared Channel (PUSCH) transmission, the retransmission thereof needs to be in a predefined subframe. In the adaptive frame structure configuration, such predefined frame structure will cause a conflict in timing. FIG. 2 illustrates a conflict scenario. In order to avoid the conflict, subframe 7 cannot be allocated to R10UE transmission. Similarly, almost all uplink subframes cannot be allocated to R10UE. A potential solution is that when a conflict occurs, the conflict subframe configuration is configured from a downlink subframe to an uplink subframe. However, there is the following risk in the method:

The gain of the adaptive frame structure is reduced. The probability of the uplink retransmission is generally larger than that of the downlink retransmission, and excessive retransmission will result in that many downlink subframes cannot transmit the downlink data, thereby not satisfying the requirements on the data burst by the system.

The Physical Hybrid-ARQ Indicator Channel (PHICH) resources conflict. Assume that the R11 UE can know an adaptive frame structure of the next frame, a position of the PHICH corresponding to its PUSCH is fixed, and if a subframe to which the PHICH belongs is configured to be an uplink frame due to a conflict, it will result in no resource transmission in the PHICH.

The complexity of the scheduling at the eNB side increases. The eNB can confirm whether its retransmission subframe is an uplink subframe or a downlink subframe after demodulating the PUSCH (i.e., a corresponding PHICH subframe). That is, the eNB will complete scheduling of two (or more) candidate frame structures.

Therefore, on the basis of the above analysis, the applicant provides a TDD adaptive frame structure retransmission method in the present embodiment. The provision of the method provides a relatively fixed subframe-based particular time sequencing relationship. Specifically, the method comprises the following operations.

In a TDD dynamic frame transmission process, for an uplink subframe, if a frame structure whose Round Trip Time (RTT) period of a PHICH and a subsequent PUSCH retransmission corresponding to the uplink subframe is 10 ms is found in seven already defined frame structures, PHICH data is transmitted on a corresponding downlink subframe in the found frame structure, and retransmitted data is transmitted on the corresponding uplink subframe in the found frame structure.

If a frame structure whose RTT period of a PHICH and a subsequent PUSCH retransmission corresponding to the uplink subframe is 10 ms is not found in seven already defined frame structures, any one of the following operations can be used:

In a first operation, a frame structure, that is not supported in the existing standard but does not conflict with other subframes, whose RTT period is 10 ms or an integral multiple of 10 ms is newly defined, the PHICH data is transmitted on a corresponding downlink subframe in the newly defined frame structure of the RTT period, and retransmitted data is transmitted on the corresponding uplink subframe in the newly defined frame structure of the RTT period. For example, for a subframe 9 of a frame structure #0 in FIG. 2, a RTT of 10 ms may be defined, i.e., an interval of PUSCH→PHICH is 6 ms, and an interval of PHICH→PUSCH is 4 ms.

In a second operation, the uplink subframe is configured to not be able to perform synchronous non-adaptive retransmission of the uplink data, and only new uplink data is transmitted in the uplink subframe.

In a third operation, the uplink subframe is configured as a downlink subframe.

Specifically, there are the following several conditions of the uplink subframes in the existing frame structure:

for an uplink subframe 2/7, the PHICH and uplink retransmission configuration of the frame structure #1 can be complied with;

for an uplink subframe 4, the PHICH and uplink retransmission configuration of the frame structure #3 can be complied with;

for an uplink subframe 3, if a current frame is not the frame structure #0, the PHICH and uplink retransmission configuration of the frame structure #1 can be complied with. And if the current frame is the frame structure #0, the subframe does not support the synchronous non-adaptive retransmission.

For an uplink subframe 8, if a next frame is not one of the frame structures #0 and #6, the PHICH and uplink retransmission configuration of the frame structure #1 can be complied with. If the next frame is the frame structure #0 or #6, the subframe does not support the synchronous non-adaptive retransmission, or is a newly defined frame structure whose RTT is 10 ms or an integral multiple of 10 ms.

For an uplink subframe 9 (frame structure 0), the subframe does not support the synchronous non-adaptive retransmission, or is a newly defined frame structure whose RTT is 10 ms or an integral multiple of 10 ms, for example, an interval of PUSCH→PHICH is 6 ms, and an interval of PHICH→PUSCH is 4 ms.

It can be seen from the above categories that the subframe-based particular time sequencing relationship can support data retransmission in most of the uplink subframes, and there are only a few conditions which do not support the data retransmission, but a new RTT period which is not supported by an existing standard but also does not completely conflict can also be defined.

The retransmission process according to the present embodiment will be further described below in conjunction with accompanying drawings.

Figure 3:
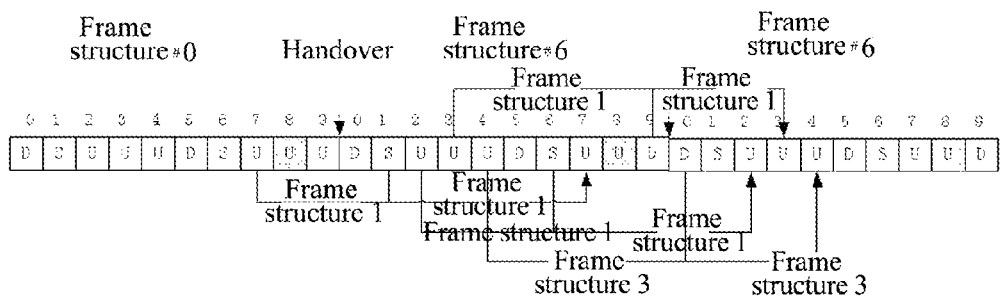
FIG. 3 is a diagram of an adaptive frame structure in an uplink data channel according to the present embodiment.

As shown in FIG. 3, when a frame structure is jumped from #0 to #6, a subframe 2/3/7 complies with a time sequencing relationship of a frame structure #1, a subframe 4 complies with a time sequencing relationship of a frame structure #3, a subframe 8 does not support the uplink data retransmission. In addition to transmitting new PUSCH data, the subframe 8 can also be configured as a downlink subframe. At this time, a SIB message of the system can indicate a frame structure #1 (R10 terminal will not be scheduled in the subframe 8), and will not conflict with the R11 terminal.

Embodiment Three

The present embodiment provides a TDD adaptive frame structure retransmission method, comprising operations in the above embodiments one and two. That is, in a TDD dynamic frame transmission process according to the present embodiment, for an uplink subframe, if a frame structure whose RTT period of a PHICH and a subsequent PUSCH retransmission corresponding to the uplink subframe is 10 ms is found in seven already defined frame structures, PHICH data is transmitted on a corresponding downlink subframe in the found frame structure, and retransmitted data is transmitted on the corresponding uplink subframe in the found frame structure. While for a downlink subframe, an uplink subframe closest to the downlink subframe is searched for in seven already defined frame structure time sequencing relationships, and if a number of PDSCHs associated with the found uplink subframe is less than or equal to 4, an A/N is fed back on the uplink subframe.

Wherein, for the uplink subframe, if a frame structure whose RTT period of a PHICH and a subsequent PUSCH retransmission corresponding to the uplink subframe is 10 ms is not found in seven already defined frame structures, any one of the following operations can be used:

In a first operation, if a frame structure that is not supported in the existing standard but does not conflict with other subframes, whose RTT period is 10 ms or an integral multiple of 10 ms is newly defined, then the PHICH data is transmitted on a corresponding downlink subframe in the newly defined frame structure of the RTT, and retransmitted data is transmitted on the corresponding uplink subframe in the newly defined frame structure of the RTT;

In a second operation, synchronous non-adaptive retransmission of the uplink data cannot be performed in the uplink subframe, and only new uplink data is transmitted in the uplink subframe;

In a third operation, the uplink subframe is configured as a downlink subframe for process. While for the downlink subframe, if a number of PDSCHs associated with the found uplink subframe closest to the downlink subframe is larger than 4, an A/N is fed back on an uplink subframe after the uplink subframe closest to the downlink subframe that is closest to the uplink subframe closet to the downlink subframe in seven already defined frame structure time sequencing relationships and of which a number of associated PDSCHs is less than or equal to 4. However, if the uplink subframe after the uplink subframe closest to the downlink subframe that is closest to the uplink subframe closest to the downlink subframe in seven already defined frame structure time sequencing relationships and of which a number of associated PDSCHs is less than or equal to 4 does not exist, an A/N is also fed back on the uplink subframe closest to the downlink subframe.

The above specific operations for the uplink subframe and downlink subframe can be known with reference to the corresponding description of embodiments one and two, and the description thereof will be omitted.

Embodiment Four

The present embodiment provides a network side device, which at least comprises a first module and a second module.

The first module primarily searches for a frame structure whose RTT period of a PHICH and a PUSCH corresponding to an uplink subframe is 10 ms in seven already defined frame structures for the uplink subframe in a TDD adaptive frame transmission process;

the second module transmits PHICH data on a corresponding downlink subframe in the frame structure found by the first module, and receives retransmitted data on the corresponding uplink subframe in the found frame structure.

Wherein, the first module may newly define a frame structure whose RTT period is 10 ms or an integral multiple of 10 ms when a frame structure whose RTT period of a PHICH and a PUSCH corresponding to the uplink subframe is 10 ms is not found. It should be illustrated that the newly defined frame structure is one that does not conflict with various subframes in the seven already defined frame structures. At this time, the second module transmits the PHICH data on a corresponding downlink subframe in the frame structure newly defined by the first module, and receives retransmitted data on the corresponding uplink subframe in the newly defined frame structure.

For a condition that a frame structure whose RTT period of a PHICH and a PUSCH corresponding to the uplink subframe is 10 ms is not found, the first module further configures the uplink subframe as a downlink subframe in addition to newly defining a frame structure whose RTT period is 10 ms or an integral multiple of 10 ms, or configures the uplink subframe to only transmit new uplink data thereon.

In addition, the above network side device may further comprise a third module which primarily semi-statically notifies a UE through a RRC signaling to enter an adaptive frame structure handover state, so that the UE performs a data operation according to a predefined time sequencing relationship; or notifies the UE of a dynamically configured time sequencing relationship of various subframes through set dynamic signaling.

In addition to said modules, the network side device may further comprise a fourth module, a fifth module, and a sixth module, which are primarily used for the processes in the downlink subframe. Specifically, the description of the fourth module, the fifth module and the sixth module is as follows.

the fourth module searches for an uplink subframe closest to the downlink subframe in seven already defined frame structure time sequencing relationships for a downlink subframe;

the fifth module receives an A/N on the uplink subframe when a number of PDSCHs associated with the uplink subframe found by the fourth module is less than or equal to 4; the sixth module searches for an uplink subframe after the uplink subframe found by the fourth module that is closest to the found uplink subframe in seven already defined frame structure time sequencing relationships and of which a number of associated PDSCHs is less than or equal to 4 and receives an A/N on the uplink subframe when a number of PDSCHs associated with the uplink subframe found by the fourth module is larger than 4.

Wherein, the sixth module may further receive an A/N on the uplink subframe found by the fourth module when the uplink subframe after the uplink subframe found by the fourth module that is closest to the found uplink subframe in seven already defined frame structure time sequencing relationships and of which a number of associated PDSCHs is less than or equal to 4 does not exist.

Embodiment Five

The present embodiment provides a terminal side device, which at least comprises a first module and a second module, wherein:

the first module searches for a frame structure whose Round Trip Time (RTT) period of a Physical Hybrid-ARQ Indicator Channel (PHICH) and a Physical Uplink Shared Channel (PUSCH) corresponding to an uplink subframe is 10 ms in seven already defined frame structures for the uplink subframe in a Time Division Duplex (TDD) adaptive frame transmission process; the second module receives PHICH data on a corresponding downlink subframe in the frame structure found by the first module, and transmits retransmitted data on the corresponding uplink subframe in the found frame structure.

It should be illustrated that the first module further newly defines a frame structure whose RTT period is 10 ms or an integral multiple of 10 ms when a frame structure whose RTT period of a PHICH and a PUSCH corresponding to the uplink subframe is 10 ms is not found by the first module, wherein the newly defined frame structure is one that does not conflict with various subframes in the seven already defined frame structures. At this time, the second module receives the PHICH data on a corresponding downlink subframe in the frame structure newly defined by the first module, and transmits retransmitted data on the corresponding uplink subframe in the newly defined frame structure.

In addition, the first module may further receive downlink data on the subframe when a frame structure whose RTT period of a PHICH and a PUSCH corresponding to the uplink subframe is 10 ms is not found; or receive new uplink data on the subframe.

There are terminal side devices proposed by some preferred solutions, which on the basis of the above first module and second module, further comprise a third module. The third module receives a semi-static notification of a Radio Resource Control (RRC) signaling, and enters an adaptive frame structure handover state, to perform a data operation according to a predefined time sequencing relationship; or acquires a time sequencing relationship of various subframes by receiving dynamic signaling.

In addition to the third module, a fourth module, a fifth module, and a sixth module may further be added, wherein:

the fourth module searches for an uplink subframe closest to the downlink subframe in seven already defined frame structure time sequencing relationships for a downlink subframe;

the fifth module transmits an A/N on the uplink subframe when a number of PDSCHs associated with the uplink subframe found by the fourth module is less than or equal to 4; and the sixth module searches for an uplink subframe after the uplink subframe found by the fourth module that is closest to the found uplink subframe in seven already defined frame structure time sequencing relationships and of which a number of associated PDSCHs is less than or equal to 4 and transmits an A/N on the uplink subframe when a number of PDSCHs associated with the uplink subframe found by the fourth module is larger than 4.

Whereas, the sixth module may transmit an A/N on the uplink subframe found by the fourth module when the uplink subframe after the uplink subframe found by the fourth module that is closest to the found uplink subframe in seven already defined frame structure time sequencing relationships and of which a number of associated PDSCHs is less than or equal to 4 does not exist.

A person having ordinary skill in the art can understand that all or a part of steps in the above method can be implemented by programs instructing related hardware, and the programs can be stored in a computer readable storage medium, such as a read-only memory, disk or disc etc. Alternatively, all or a part of steps in the above embodiments can also be implemented by one or more integrated circuits. Accordingly, each module/unit in the above embodiments can be implemented in a form of hardware, or can also be implemented in a form of software functional module. The present application is not limited to any particular form of a combination of hardware and software.

The above description is only the preferred embodiments of the present document and is not intended to limit the protection scope of the present document. Any modifications, equivalent substitutions, improvements, etc. which are made within the spirit and principle of the present document should belong to the protection scope of the present document.

INDUSTRIAL APPLICABILITY

The technical solution of the present application ensures the HARQ compatibility with an uplink data channel of an R10UE. In addition, an A/N feedback of a PDSCH is further configured according to an uplink A/N resolution, thereby improving the retransmission performance.

What is claimed is:

1. A Time Division Duplex (TDD) adaptive frame structure retransmission method, comprising:
   in a TDD adaptive frame transmission process, for an uplink subframe, if a frame structure whose Round Trip Time (RTT) period of a Physical Hybrid-ARQ indicator channel (PHICH) and a Physical Uplink Shared Channel (PUSCH) corresponding to the uplink subframe is 10 ms is found from seven already defined frame structures, transmitting PHICH data on a corresponding downlink subframe in the found frame structure, and receiving retransmitted data on the corresponding uplink subframe in the found frame structure.

2. The method according to claim 1, wherein the method further comprises:
   if a frame structure whose RTT period of a PHICH and a PUSCH corresponding to the uplink subframe is 10 ms is not found from the seven already defined frame structures,
   newly defining a frame structure whose RTT period is 10 ms or integral multiple of 10 ms, transmitting the PHICH data on a corresponding downlink subframe in the newly defined frame structure, and receiving retransmitted data on the corresponding uplink subframe in the newly defined frame structure, wherein the newly defined frame structure is a frame structure that does not conflict with each of the subframes in the seven already defined frame structures.

3. The method according to claim 1, wherein,
if a frame structure whose RU period of a PHICH and a PUSCH corresponding to the uplink subframe is 10 ms is not found from the seven already defined frame structures,
only transmitting new uplink data on the uplink subframe; or
configuring the uplink subframe as a downlink subframe.

4. The method according to claim 1, further comprising:
in a TDD adaptive frame transmission process, for a downlink subframe, searching for an uplink subframe closest to the downlink subframe from seven already defined frame structure time sequencing relationships, and if a number of Physical Downlink Shared Channels (PDSCHs) associated with the found uplink subframe is less than or equal to 4, feeding back an Acknowledgement/Negative Acknowledgement (A/N) reply on the uplink subframe; and
if the number of PDSCHs associated with the found uplink subframe is larger than 4, feeding back an A/N on an uplink subframe after the found uplink subframe which is closest to the found uplink subframe in the seven already defined frame structure time sequencing relationships and of which a number of associated PDSCHs is less than or equal to 4.

5. The method according to claim 4, wherein,
if there does not exist an uplink subframe after the found uplink subframe which is closest to the found uplink subframe in the seven already defined frame structure time sequencing relationships and of which a number of associated PDSCHs is less than or aqua to 4, feeding back an A/N on the found uplink subframe.

6. The method according to claim 5, wherein the method further comprises:
In the TDD adaptive frame transmission process, a network side semi-statically notifying a User Equipment (UE) through a Radio Resource Control (RRC) protocol signaling to enter an adaptive frame structure hangover state, and after receiving the RRC, the UE performing a data operation according to a predefined time sequencing relationship; or
the network side notifying the UE of a dynamically configured time sequencing relationship of each subframe through a set dynamic signaling, and the UE performing a data operation according to the time sequencing relationship of each subframe in the set dynamical signaling received.

7. The method according to claim 4, wherein the method further comprises:
In the TDD adaptive frame transmission process, a network side semi-statically notifying a User Equipment (UE) through a Radio Resource Control (RRC) protocol signaling to enter an adaptive frame structure handover state, and after receiving the RRC, the UE performing a data operation according to a predefined time sequencing relationship; or
the network side notifying the UE of a dynamically configured time sequencing relationship of each subframe through a set dynamic signaling, and the UE performing a data operation according to the time sequencing relationship of each subframe in the set dynamical signaling received.

* * * * *